United States Patent
Giannopoulos et al.

(10) Patent No.: US 11,537,284 B2
(45) Date of Patent: Dec. 27, 2022

(54) METHOD FOR SCROLLING VISUAL PAGE CONTENT AND SYSTEM FOR SCROLLING VISUAL PAGE CONTENT

(71) Applicant: RINGCENTRAL, INC., Belmont, CA (US)

(72) Inventors: Theodoros Giannopoulos, Nafplio (GR); Vasileios Giatilis, Athens (GR); Lampros Pappas, Iraklio (GR)

(73) Assignee: RINGCENTRAL, INC., Belmont, CA (US)

( * ) Notice: Subject to any disclaimer, the term of this patent is extended or adjusted under 35 U.S.C. 154(b) by 375 days.

(21) Appl. No.: 15/602,619

(22) Filed: May 23, 2017

(65) Prior Publication Data

US 2017/0351395 A1 Dec. 7, 2017

(30) Foreign Application Priority Data

Jun. 2, 2016 (EP) .................................... 16172751

(51) Int. Cl.
*G06F 3/0485* (2022.01)
*G06F 3/04845* (2022.01)
*G09G 5/34* (2006.01)

(52) U.S. Cl.
CPC ........ *G06F 3/0485* (2013.01); *G06F 3/04845* (2013.01); *G09G 5/34* (2013.01); *G06F 2203/04804* (2013.01); *G09G 2340/0464* (2013.01); *G09G 2340/14* (2013.01); *G09G 2354/00* (2013.01)

(58) Field of Classification Search
CPC ............... G06F 3/0485; G06F 3/04845; G06F 2203/04804; G09G 5/34; G09G 2340/0464; G09G 2340/14; G09G 2354/00
See application file for complete search history.

(56) References Cited

U.S. PATENT DOCUMENTS

| | | | |
|---|---|---|---|
| 5,726,687 A | 3/1998 | Belfiore et al. | |
| 6,825,860 B1 | 11/2004 | Hu et al. | |
| 8,438,496 B1* | 5/2013 | Hegde | G06F 3/0485 |
| | | | 715/784 |
| 8,595,644 B1 | 11/2013 | Clark | |
| 2002/0126154 A1 | 9/2002 | Watson | |
| 2010/0269038 A1* | 10/2010 | Tsuda | G06F 3/0485 |
| | | | 715/702 |
| 2011/0145737 A1* | 6/2011 | Laugwitz | G06F 3/0482 |
| | | | 715/763 |
| 2012/0005623 A1* | 1/2012 | Ishak | G06F 3/0485 |
| | | | 715/786 |
| 2014/0281933 A1 | 9/2014 | Mellor | |
| 2015/0067557 A1* | 3/2015 | Lee | G06F 3/0487 |
| | | | 715/765 |
| 2015/0067577 A1 | 3/2015 | Li et al. | |
| 2015/0169699 A1* | 6/2015 | Gilbert | G06F 3/0482 |
| | | | 707/722 |
| 2016/0292023 A1* | 10/2016 | Gilbert | G06F 9/543 |

* cited by examiner

*Primary Examiner* — Mandrita Brahmachari
(74) *Attorney, Agent, or Firm* — Finnegan, Henderson, Farabow, Garrett & Dunner LLP

(57) ABSTRACT

A method for scrolling visual page content in a predetermined direction on a screen of a display device can include displaying at least one visual object on the screen, detecting a scrolling action for moving the at least one visual object on the screen, detecting information on scrolling behavior of the displayed visual object, and displaying a scrolling of the visual object on the screen based on the detected information on the scrolling behavior.

21 Claims, 11 Drawing Sheets

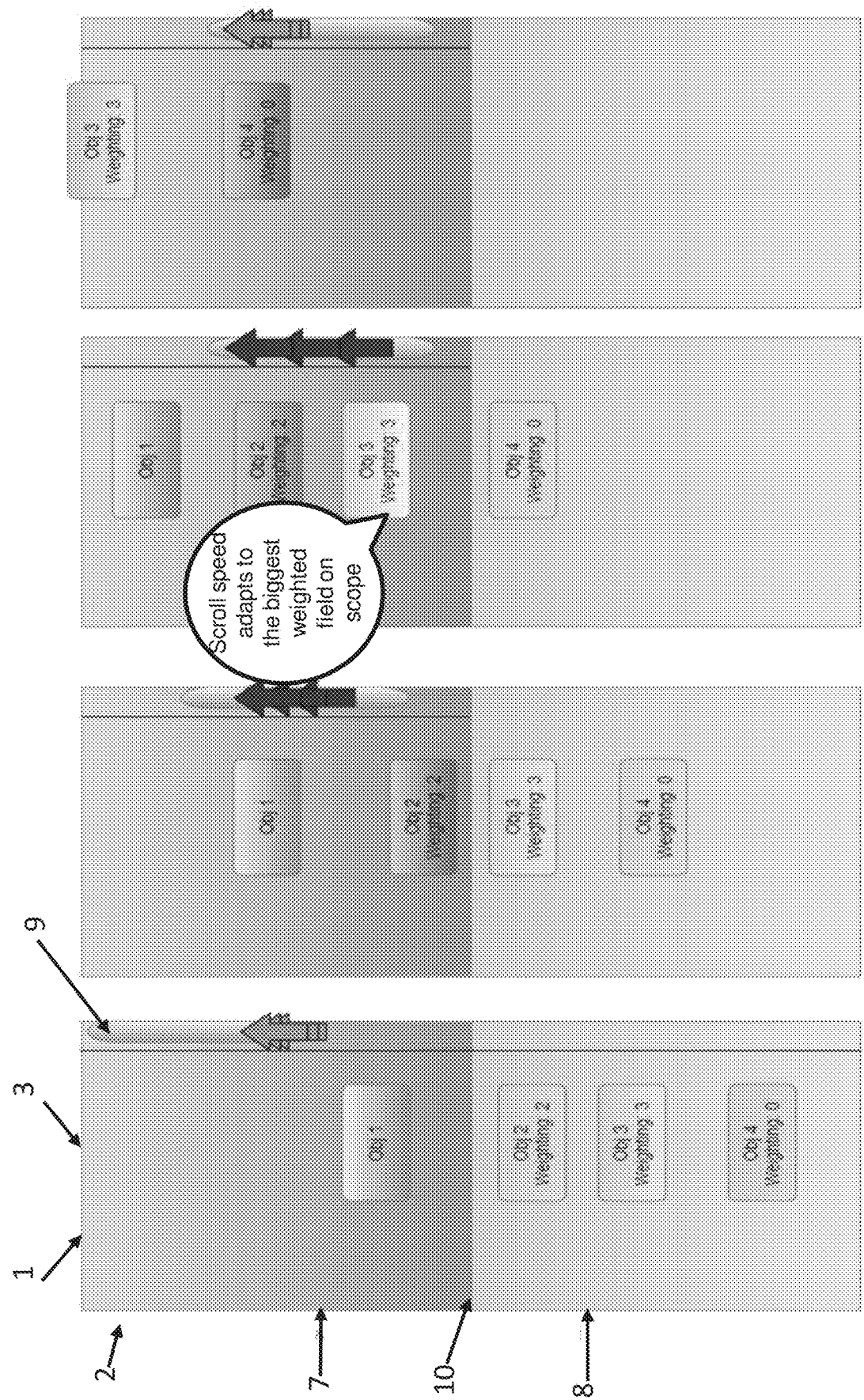

METHOD FOR SCROLLING VISUAL PAGE CONTENT AND SYSTEM FOR SCROLLING VISUAL PAGE CONTENT

CROSS-REFERENCE TO RELATED APPLICATIONS

The present application claims priority to European Patent Application No. EP16172751.6, which was filed on Jun. 2, 2016. The entirety of this European Patent Application is incorporated by reference herein.

FIELD OF THE INVENTION

This innovation relates to a method, non-transitory computer readable medium, apparatus, and system configured for scrolling visual page content on a screen of a display device in a predetermined direction. Embodiments of the innovation can be configured as non-transitory memory, an electronic device (e.g. a smart phone, a tablet, a computer, a television, a liquid crystal display, a monitor, etc.), or a communication system (e.g. a network, etc.).

BACKGROUND OF THE INVENTION

In many web pages, mouse scrolling functionality is provided via a browser mechanism. As input, this mechanism uses steps of a mouse scrolling action and rolls the page up or down based on how many steps are input. The actual scroll steps in the webpage are dependent on the browser implementation. If for instance a browser has a setting of each mouse scroll step corresponding to a 10 pixel step, then, when a user scrolls 10 steps with the mouse, the page will be shifted 100 pixels up or down depending on the orientation. This implementation ensures a smooth and linear search on the web page. However, there exist several drawbacks depending on the web page design.

That is, with the scrolling functionalities known from prior art, continuous scrolling causes massive content change on the screen which is exhausting for the user. Moreover, if fast scrolling is performed, information loss has to be encountered as the content is passed quickly in and out of the user's view.

US Patent Application Publication Nos. 2015/0067557, 2015/0169699, and 2014/281933 and U.S. Pat. Nos. 6,825, 860 and 8,595,644 disclose examples of software frameworks and web browser technologies that control the presentation of web content during scrolling. But, none of these solutions overcome the above mentioned drawbacks.

SUMMARY OF THE INVENTION

The present innovation was developed after it was recognized that conventional scrolling technology failed to provide smart scrolling features for web pages supporting the reader to perceive the content while in motion, thereby providing a better user experience that is less tiring. Embodiments of our innovation can be configured to address such issues to overcome drawbacks from conventional scrolling technology.

Embodiments of our innovation include a method for scrolling visual page content, non-transitory computer readable medium that define such a method so that a device performs the method when a processor of the device runs code of a program that defines this method, an electronic device configured to utilize such a method, and a system for scrolling visual page content.

Embodiments of a method for scrolling visual page content in a predetermined direction on a screen of a display device is provided. The visual page content can include a predetermined number of visual objects that are arranged for subsequent display in the predetermined direction. At least one of the visual objects can include information on scrolling behavior of at least one of the number of visual objects on the screen. Embodiments of the method can include the steps of: displaying at least one visual object on the screen, detecting a scrolling action for moving the at least one visual object on the screen, detecting the information on scrolling behavior of the displayed visual object, and scrolling the visual object on the screen based on the detected information on scrolling behavior.

By use of at least some embodiments of the method for scrolling visual page content, the drawbacks that occur from use of conventional scrolling technology as discussed above can be overcome. For instance, embodiments of the method can provide user-friendly smart scrolling features for web pages which enable the user to easily perceive content comprised in specific visual objects of interest while scrolling the content in a predetermined direction. For the user who otherwise would have to pay close attention to the moving content and has to be intensely concentrated, a substantial advantage can be provided by the inventive method which due to the smart scrolling features is less tiring for the user.

Embodiments of the method can be implemented in a number of ways. For instance, embodiments of the method can be implemented either closely coupled to a web browser's functionality or loosely coupled as an external software module (plug-in). In both cases, the web page designer needs to define which of the elements of the web page that the web designer edits need to get the specific differentiated scrolling behavior. In order to define the affected objects' behavior, a markup language or other type of suitable coding language can be used to define a method for storage in non-transitory memory. For example CSS (Cascading Style Sheets) or the Hypertext Markup Language (HTML) could be utilized for defining steps of a method to be performed by a device or system. It should be appreciated that any style sheet language or more generic markup language could be used instead of CSS per se. In such embodiments, a web object's display mode can be defined via use of that coding language.

Mark-up languages with related tags can be utilized in embodiments of the method, apparatus, or system. A web designer who knows the importance of the section of a web-page can apply those tags for smart scrolling based on the teaching provided herein. Further, extra fields of the markup language may be used in order to achieve the desired result at each case.

According to a preferred embodiment of the invention, the step of displaying at least one visual object on the screen further comprises displaying a first visual object of the predetermined number of visual objects on the screen, while a second visual object of the predetermined object remains invisible, and wherein the step of detecting a scrolling action for moving the at least one visual object on the screen comprises detecting a scrolling action for moving the first object into a predetermined direction on the screen such that the second object will be visible on the screen. In some embodiments, the method can also include the steps of: determining a vertical position of the first object on the screen for defining a reference position on the screen, and displaying the second visual object at the reference position on the screen. This preferred embodiment can be configured to provide a kind of visual magnetic effect. The visual object in focus can always be displayed at a defined position of the predecessor visual object or objects. Thereby, elements or visual objects of a web page are changed without changing their position. Thereby, massive content change as well as content loss during fast scrolling of content on a screen is avoided and the user is relieved from following the moving content on the screen with the eyes, because the user only has to concentrate on one predefined position on the screen which is less exhausting for the user.

According to a further preferred embodiment, upon detecting a further scrolling action by means of which the first and the second objects are moved into the predetermined direction on the screen, a third visual object to be displayed subsequently to the second visual object is displayed at the reference position on the screen. Thereby, always the visual object which during scrolling will be displayed on the screen subsequent to the currently displayed visual object will be located at the same spot on the screen, so the user only has to concentrate on watching this specific spot instead of following the motion of the visual objects while scrolling content of a web page on the screen.

According to a further preferred embodiment, the predetermined direction is a vertical direction. Of course, in other embodiments, the predetermined direction may be a horizontal direction or another direction.

In some embodiments, the movement of the visual objects on the screen is effected in the vertical direction upon scrolling a scrolling means upwards or downwards. For example, by turning or rotating a wheel provided on a computer mouse, the content on the web page will be moved accordingly. Other scrolling means can be implemented just as well. For example, scrolling of content on a screen can be effected by moving a navigation bar usually displayed at the right hand side of the screen up or down via a pointer device or by use of a user's finger for a touch screen enabled interface.

According to a further preferred embodiment, a vertical position of the first object on the screen is determined for defining the reference position. This reference position may be utilized for effecting scrolling. For instance, in some embodiments the visual object to be displayed subsequent to the visual object currently displayed at the reference position is moved directly to the reference position upon detecting the scrolling action to avoiding extensive content change on the screen while scrolling the web page in a predetermined direction.

In some embodiments, the method can further comprises a step of determining if the visual object to be displayed subsequent to the visual object currently displayed at the reference position is cut off or at least partially cut by the lower boundary of the screen. The method may further comprise a step of determining if the first visual object has an objectID indicating that the visual objects to be displayed subsequently to the first visual object are to be displayed at the reference position of the first visual object. According to another preferred embodiment, the step of detecting a scrolling action for moving the at least one visual object on the screen can further comprise detecting a scrolling action for moving the visual objects in a predetermined direction.

Embodiments of the method can also further include: detecting a predefined scrolling speed according to an operation of a scrolling means (e.g. a pointer device clicking on a screen location, manipulation of a scrolling wheel of a mouse, use of a touch screen interface to provide a scrolling input, etc.), and defining one or more visual objects as highlighted objects for which, upon detection of the scrolling action, a scrolling speed different from the predefined scrolling speed is applied. Such embodiments can permit certain sections of a web page to be decelerated or accelerated relative to or based on a predefined scrolling speed during mouse wheel or navigation bar operation. Since especially fast scrolling can cause information loss as visual objects of a web page are passed quickly in and out of the user's view, a fast scrolling state can be overridden whereby highlighted objects which may be objects of specific interest as previously defined by the designer of the web page are moved, for example, slower so that the user may easily view the content of interest although applying a fast scrolling speed. In some embodiments, a first scrolling speed different from the predefined scrolling speed is slower than the predefined scrolling speed so that content or visual objects of interest remain visible on the screen longer than they would according to the applied scrolling speed. The first scrolling speed may even be zero, thereby enabling viewing or reading of the thus presented content or visual object of interest for the user. In this case, namely, if the first scrolling speed is zero for a highlighted object, the highlighted object may resume the predefined scrolling speed after a predetermined time period has elapsed. Moreover, a second scrolling speed different from the predefined scrolling speed may be higher than the predefined scrolling speed. Especially, if there are visual objects of negligible interest for the user, then the scrolling speed may be increased until the next highlighted object appears on the screen which again is of interest for the user. Preferably, the first or the second scrolling speed are applied with reference to at least one highlighted object. Upon the highlighted object entering the screen at a lower or upper side of the screen, the first or second scrolling speed may be applied. In some embodiments, after a highlighted object appears on the screen, the first scrolling speed may be applied for a first predetermined time period and, thereafter, the second scrolling speed may be applied until another highlighted object is to appear on the screen.

The predetermined direction of scrolling can be a vertical direction whereby the movement of the visual objects on the screen is effected in the vertical direction upon operating the scrolling means so as to scroll the visual page content upwards or downwards. In other alternative embodiments, the predetermined direction of scrolling may be a horizontal direction (e.g. leftward and rightward motions).

According to a further preferred embodiment, the highlighted object being moved on the screen upon detection of a scrolling action recovers the predefined scrolling speed upon a user clicking on the highlighted object. In some embodiments, such clicking may occur via a user utilizing a pointer device (e.g. a mouse) to elect the highlighted object or may be performed by use of the user's finger touching a touch screen display on a location at which the highlighted object is displayed. The scrolling can be configured so that the visual page content can be scrolled at the predefined scrolling speed if no highlighted object is visible on the screen.

According to yet another preferred embodiment, the scrolling speed can be controlled according to a weighting factor defined for each visual object to be displayed. The weighting factor can be determined based on a significance of the visual object to be displayed. For example, if the significance of the visual object is high, the scrolling speed can be set to be lower than the predefined scrolling speed, and if the significance of the visual object is low, the scrolling speed can be set to be higher than the predefined scrolling speed.

A system for scrolling visual page content is provided. Embodiments of the system can include a user terminal comprising a display device with a screen adapted to display the visual page content. The user terminal can be configured as an electronic device that includes hardware such a processor and non-transitory memory. The visual page content can include a predetermined number of visual objects arranged for subsequent display in a predetermined direction with at least one of the visual objects comprising information on scrolling behavior of at least one of the number of visual objects on the screen. The system can also comprises a scrolling means for effecting a scrolling action on the screen. The scroller means can be a pointer device (e.g. a mouse, a stylus, etc.), a keyboard, a key pad, or can be a touch screen capability of the device's screen. The device can include a controller which is adapted to display at least one visual object on the screen, detect a scrolling action for moving the at least one visual object on the screen, detect the information on scrolling behavior of the displayed visual object, and scroll the visual object on the screen based on the detected information on scrolling behavior.

Other details, objects, and advantages of the apparatus, system, and device for visually scrolling content and methods of making and using the same will become apparent as the following description of certain exemplary embodiments thereof proceeds.

BRIEF DESCRIPTION OF THE DRAWINGS

Exemplary embodiments of apparatus, system, and device for visually scrolling content and methods of making and using the same are shown in the drawings included herewith. It should be understood that like reference numbers used in the drawings may identify like components. Further advantages, features and characteristics of the invention will become apparent from the subsequent description of preferred embodiments with reference to the drawings, in which:

FIG. 8a to FIG. 8d show still a further schematic illustration of a web page presented on a screen according to yet another embodiment of the invention;

DETAILED DESCRIPTION OF EXEMPLARY EMBODIMENTS

FIG. 1a to FIG. 1d show a schematic illustration of a web page 1 presented on a screen 2 of a display device in various states of a scrolling procedure according to an embodiment of the present invention. The screen 2 may be a display of a monitor, a tablet, a smart phone, a laptop computer, a desktop computer, a television, or other electronic device that includes hardware that includes non-transitory memory connected to a processor. The device may also include other hardware, such as at least one transceiver unit and may also include software and/or data stores stored in the memory. Software can be stored in the memory for execution by a processor so that a method defined by the code of the software is performed by the device.

Figure 1:
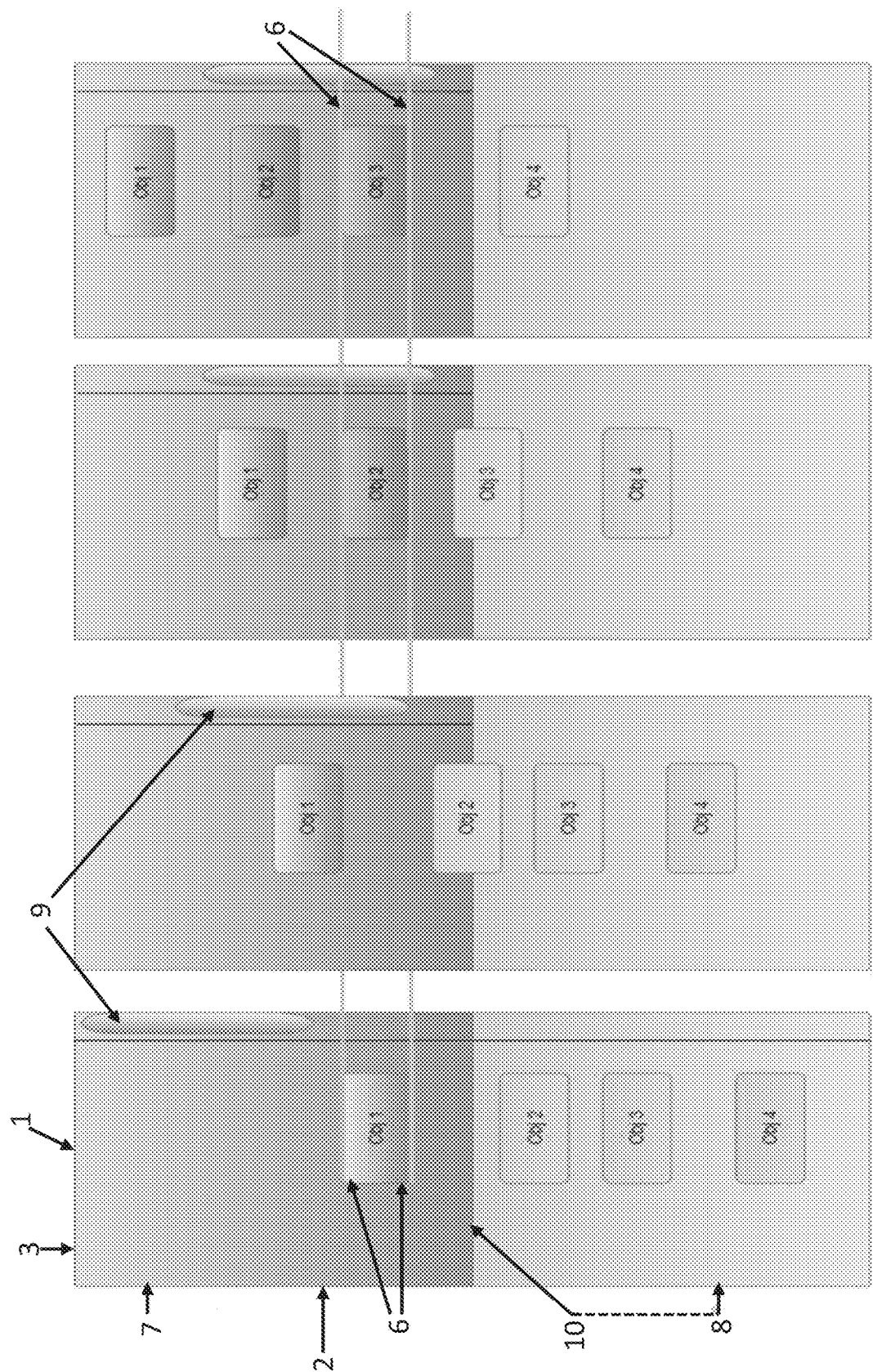
FIG. 1a to FIG. 1d show a schematic illustration of a web page presented on a screen in various states of a scrolling procedure.

The web page 1 that is displayable via the screen 2 includes a visible part 7 which is currently displayed on the screen 2, and a non-visible part 8. As can be seen in the figures, visual page content of the web page 1 is represented by a number of visual objects Obj1, Obj2, Obj3, Obj4, from which a first visual object Obj1 is displayed on the screen 2. The other visual objects Obj2, Obj3, Obj4 are not visible in the state which is shown in FIG. 1a. Rather, in the state shown in FIG. 1a, the visual objects Obj2, Obj3, Obj4 are still in a non-visible part 8 of the web page 1.

For making the other visual objects Obj2, Obj3, Obj4 visible, a scrolling action, for example, by using a mouse wheel (not shown) or by manipulating a navigation bar 9, has to be carried out upon which the visual page content will be moved in a predetermined direction, which here is vertically upwards.

According to prior art, as shown in FIG. 1b, while scrolling the visual page content in the predetermined direction, the latter gradually moves upwards until the second visual object Obj2 enters the screen 2 and continuously is fully displayed on the screen 2.

According to an embodiment of the present invention as shown in FIG. 1c and FIG. 1d, in contrast to the continuous movement of the visual objects over the visible part 7 of the screen 2, here, instead of being moved upwards continuously, as shown in FIG. 1b, the visual object to be displayed on the screen 2 next will be moved instantaneously to a predefined reference position 6. For defining the reference position, the vertical position of the first visual object Obj1 on the screen 2 is determined on the screen. Thus, upon detecting a scrolling action, the second visual object Obj2 which in the predetermined direction is subsequent to the first visual object Obj1 will be directly placed at the reference position 6 on the screen 2 as it enters it at its lower edge or bottom line 10. Upon further scrolling, as shown in FIG. 1d, also the third visual object Obj3 which is to be displayed subsequent to the second visual object Obj2 will also be displayed in the reference position 6. By this procedure, the visual content represented by a plurality of visual objects Obj1, Obj2, Obj3, Obj4 displayed on the screen 2 is changed, but the display position for the visual objects Obj1, Obj2, Obj3, Obj4 is maintained by using the reference position 6. Thus, less content is moved within the web page 1 in order reduce a tilting effect experienced by the user of the web page 1 and to thereby also reduce tiring of the user.

For realizing the above procedure, a new CSS property may be defined named objref. This may take the values of "false" meaning that the behavior is identical to the default one, or <objectID> meaning that the referenced visual object is a visual object displayed at a position on the screen that subsequent visual objects to be displayed on the screen will also assume. This field may be inserted into the subsequent visual objects that the web designer wants to present at the same location on the screen at which the first visual object Obj1 is placed, namely, at the thus defined reference position. When the second visual object Obj2 subsequent to the first visual object Obj1 is displayed on the screen, it will inherit the position of the first visual object Obj1 and it will also confer this position to the subsequent visual objects, Obj3, Obj4, . . . Objn. This means that the position, in the example shown in FIG. 1a, FIG. 1c, and FIG. 1d a vertical position, will be taken as the reference position when the next visual object is about to enter the browser's view, namely, the visible part of the screen. This procedure may be applied regardless of the way the web page is scrolled.

Figure 2:
FIG. 2 shows an example of a web page with a plurality of visual objects.

FIG. 2 shows an example of a web page 1 which comprises content that on a screen may not be displayed completely, so that there would be a visible part and an invisible part, as has been described in connection with FIG. 1a already. The web page 1 comprises a picture 4 and text passages 5. Here, three text passages which are framed constitute visual objects of interest which have been predefined by a web designer, namely, the visual objects Obj1, Obj2, Obj3 which may be presented on a screen as has been described in connection with FIG. 1a, FIG. 1c, and FIG. 1d.

Namely, a reference position will be determined as the first visual object Obj1 is displayed on the screen, to which the subsequent second and third visual objects Obj2, Obj3 will be moved immediately instead of being moved continuously according to the scrolling action of a scrolling means.

Figure 3:
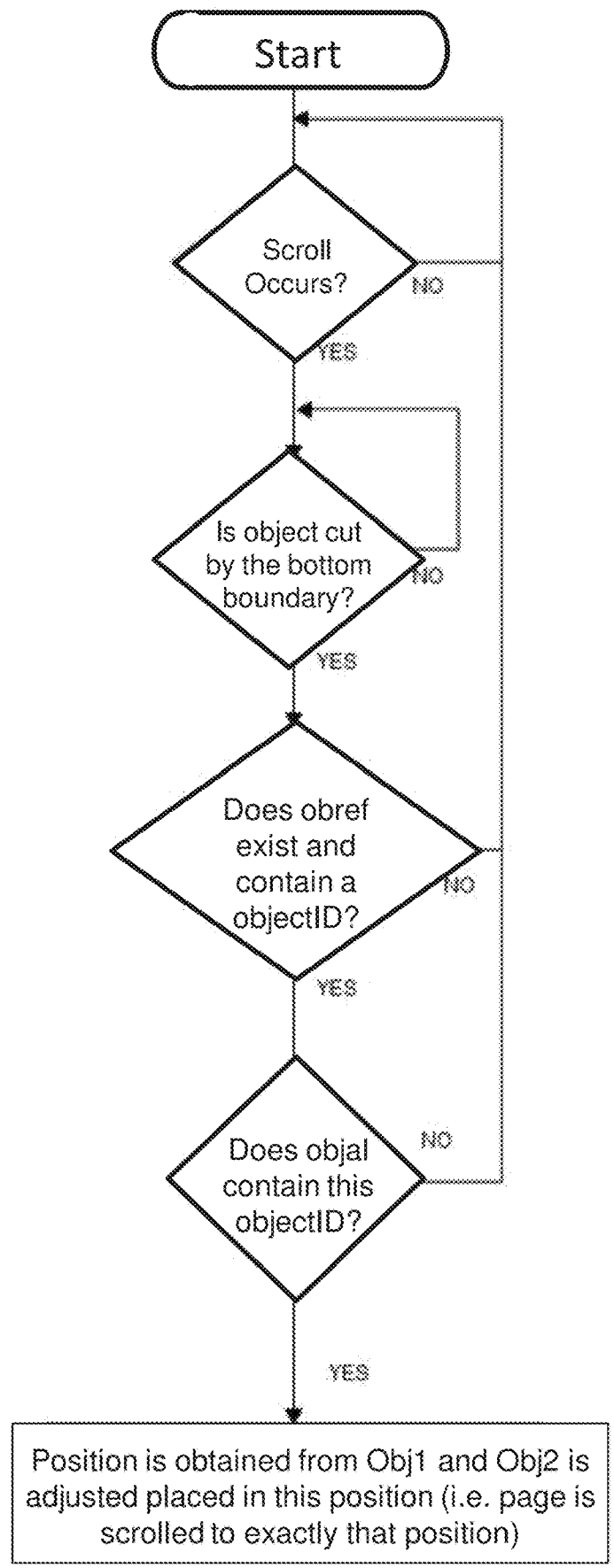
FIG. 3 shows a flowchart of a method for scrolling visual page content according to an embodiment of the invention.
Figure 4:
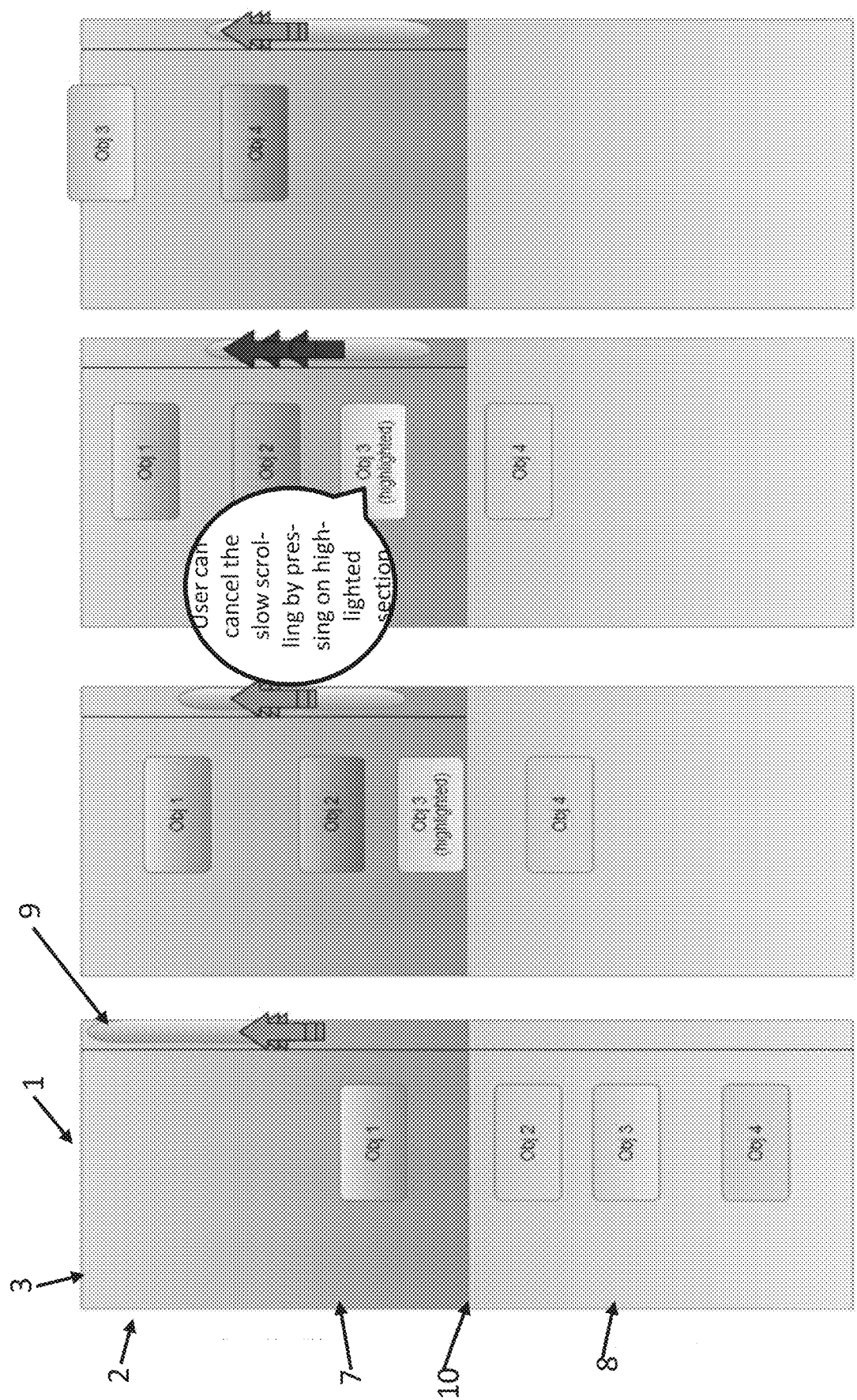
FIG. 4a to FIG. 4d show a further schematic illustration of a web page presented on a screen in various states of a scrolling procedure according to a further embodiment of the invention.

FIG. 3 shows a flowchart of a method for scrolling visual page content in a predetermined direction on a screen of a display device according to an embodiment of the invention. After start, in a first step, a detection if a scrolling action for moving visual objects Obj1, Obj2, Obj3, Obj4 of a web page on the screen is carried out as it is identified if scroll occurs. If scroll occurs, then it is determined, if the visual object which is to be displayed next on the screen is cut by the bottom boundary or bottom line 10 of the screen 2, i.e. the boundary between the visible part 7 and the nonvisible part 8 of the web page 1. If this is true, a further determination is made whether this visual object contains the property objref and whether it contains an objectID representing the scrolling information for this visual object. If this again is determined to be true, then in a next step, it is determined whether a specified property objal contains this objectID, and if this is true, in a next step the visual object to be displayed next, namely visual object Obj2 to be displayed subsequent to visual object Obj1 being currently displayed, will obtain the position of Obj1 on the screen which actually has been defined as the reference position and which all following visual objects to be displayed will assume as well immediately upon crossing the boundary between the visible part and the invisible part instead of being moved upwards across the screen continuously.

FIG. 4a to FIG. 4d show a schematic illustration of a web page 1 presented on a screen 2 of a display device (not shown) the content of which is presented in a differentiated scrolling mode according to an embodiment of the present invention. Since the differentiated scrolling mode is specifically well suited if the user performs a fast scrolling operation on a scrolling means, first of all, it has to be determined whether the scrolling action, in fact, is fast scrolling or not.

When a user of a web page scrolls fast, there are some items or objects of the content of the web page 1 that will not be easily visible in the flow of information that is passed before his eyes on the screen 2. However, fast scrolling is a rather complicated procedure. There is no absolute criteria to determine whether the user scrolls fast. For instance, users may perform fast scrolling in bursts since the mouse wheel juts out by only ⅓ to ½ on the top of the mouse. If scrolling is performed by using the navigation bar 9, it is simpler to determine whether the user performs fast scrolling through the web page 1.

For example, fast scrolling by using a mouse wheel could, for example, be defined as follows. Scrolling via a mouse wheel usually involves steps (mouse wheel stops). When the user scrolls fast, these steps come in bursts of 4 to 5 stops during a very small amount of time and a short time between the bursts. In this case, it may be determined if the user, in fact, is in a fast scrolling mode or not by the amount of stops and/or the period of time. If fast scrolling is carried out by using the navigation bar 9, however, scroll is not quantified. In this case, the scrolling speed may be determined by the amount of content scrolled by the total amount of content. For example, in the example presented in FIG. 4, it can be seen that the visible content covers up 1/10 of the content. A user moving the navigation bar 9 from section to section (1/10 to 2/20) with a pace of less than one second may thus be considered to be in a fast scrolling mode.

Further, besides the above described fast scrolling by means of the navigation bar 9, fast scrolling can be performed with mouse wheel click to which the same as described above applies. This usually produces an arrow symbol that acts according to the back and forth movements of the mouse and scrolls the web page accordingly. Also, fast scrolling can be performed by using the arrow keys on the keyboard (not shown). When the arrow keys (Up and Down) are used for web page navigation, a fast scrolling mode implemented by the user may be determined if the time of the keys being pressed down exceeds a given amount of time, e.g., milliseconds. Moreover, fast scrolling can be achieved by using the PageUp and PageDown keys on the keyboard. When PageUp or PageDown keys are used for web page navigation, a fast scrolling mode implemented by the user may be determined regardless of the time that the keys are kept pressed down.

However, if a fast scrolling action has been determined, since some items are moved too fast to be perceived or recognized, it is advantageous to use highlighting for certain sections or visual objects of specific interest wherein the highlight feature has to be set by the web designer. For example, if a trading web page is concerned on which a day trader would like to see information about stocks and there are important news the trader should not miss, highlighting of specific visual objects of interest may be very advantageous for not missing important information, even when scrolling fast. Thus, according to the embodiment presented in FIG. 4a to FIG. 4d, the fast scrolling action, after having been determined as outlined above, is overridden and highlighted objects, for example, highlighted object Obj3 in FIG. 4b, is moved on the screen in a predetermined direction which here is vertically upwards according to a scrolling speed different from the scrolling speed actually intended by fast scrolling. In order to make the highlighted object Obj3 clearly visible to the user, the highlighted object Obj3 is moved slower across the screen 2 so that the user has enough time to recognize the information presented by the visual object Obj3 on the screen 2.

If the user nevertheless wants to cancel this scrolling feature, namely, the slow movement of the highlighted object Obj3 across the screen 2, he may simply click on the highlighted visual object Obj3 or section and the latter will resume its original fast scrolling speed again.

For realizing the above described differentiated scrolling feature, a new CSS property may be defined named: objspeed. This may take the values "false" meaning the behavior is identical to the default one, or "true" meaning that scroll will be stalled. This field will be inserted in the web page objects that the web page designer desires to present with reduced scrolling speed. Transferred to the example shown in FIGS. 4a to 4d, then Obj3 would be an object for which the objspeed property is set to "true". When Obj3 is completely visible on the screen 2 (FIG. 4b), the scrolling speed will automatically be reduced (FIG. 4b, 4c) and the visual object Obj3 is highlighted for feedback to the web page user. The user may click on the highlighted object in order to override the reduced scrolling speed, as already outlined above. When the visual object Obj3 is not visible on the screen 2 anymore (FIG. 4d), then the scrolling speed returns back to the speed the user has selected.

Figure 5:
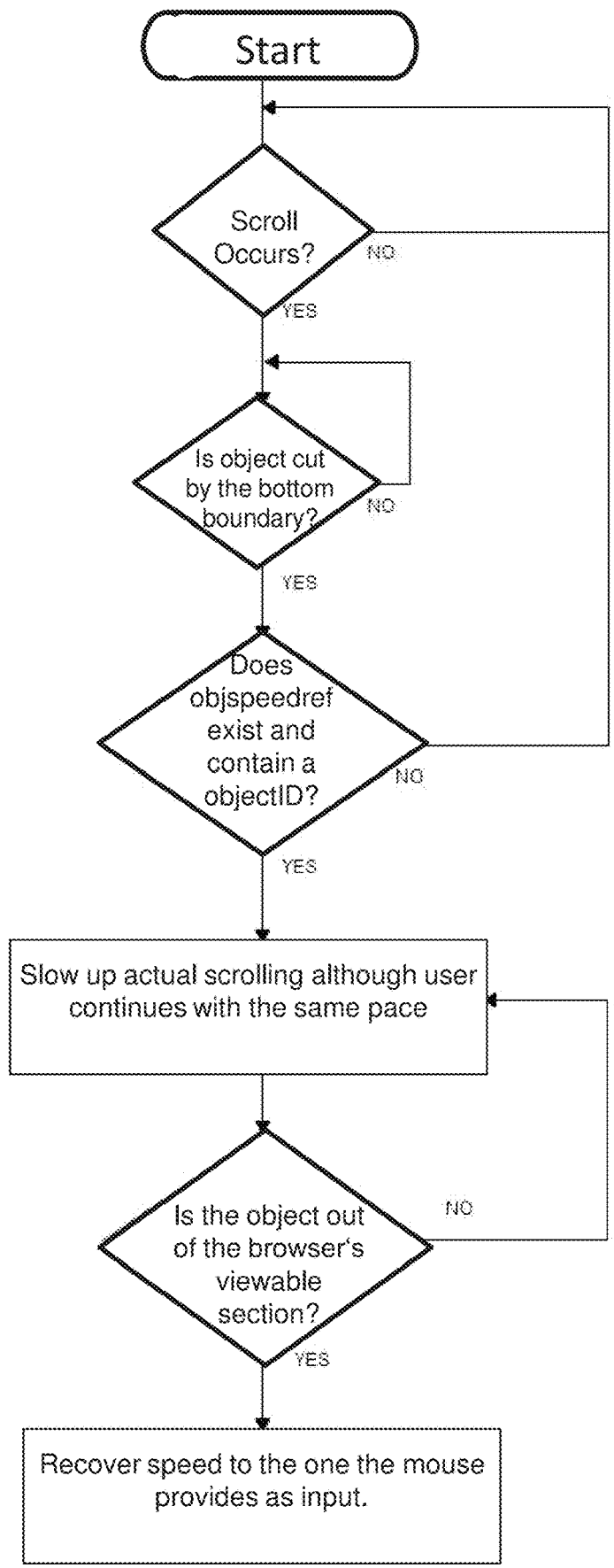
FIG. 5 shows a flowchart of a method for scrolling visual page content according to the embodiment shown in FIG. 4a to FIG. 4d.

FIG. 5 shows a flowchart of a method for scrolling visual page content according to the embodiment described in connection with FIGS. 4a to 4d. After starting the procedure, first a determination if a scrolling action according to a predefined scrolling speed occurs is made. If the determination is positive, then it is determined, if the visual object is cut by the bottom boundary or bottom line of the screen for identifying whether the visual object enters the screen so as to be displayed. If this again can be confirmed, then it is determined, if the CSS property objspeed exists, and if the visual object to be presented next on the screen has an objectID. If both is true, then scrolling according to the predefined scrolling speed of the thus identified visual object will slowed down as soon as it crosses the lower border of the screen so as to enter the latter. If the visual object at the upper boundary or upper line 3 of the screen exits the latter, then the original predefined scrolling speed is resumed according to input via a scrolling means, as a mouse or navigation bar. According to this method, the visual objects qualifying for being displayed on the screen with a speed different from the predefined scrolling speed may be highlighted.

FIG. 6a to FIG. 6d show still a further schematic illustration of a web page 1 presented on a screen 2 according to yet another embodiment of the invention. In contrast to the method described in connection with FIGS. 4a to 4d and FIG. 5, here, if fast scrolling is performed by a user, the scrolling speed of a specifically marked visual object or section of the web page 1 may be slowed down to zero, i.e., a stopping will occur. This feature is specifically suited for situations when a user performs fast scrolling and the web page 1 contains items that are too complex to understand while they are moved across the screen 2 (e.g., diagrams, models, etc.). For such complex web page items, it is advantageous, if scrolling is stopped when such item is displayed on the screen so the user has enough time to study the information presented. Stopping may be performed for a certain time interval, wherein the functionality of this feature and the stopping time have to be defined by the web page designer for the respective web page item or visual object. Thereby, the scrolling speed selected by the user will be overridden and the content of the specific sector or visual object will be statically visible for a desired amount of time. Just as for the embodiment shown in FIGS. 4a to 4d, also here the item or visual object of interest thus marked may be highlighted additionally. Further, an indication that fast scrolling is performed should be provided and scrolling could be stopped at any given time. This could be a notification element from the browser side, for example, or even from the page's content, i.e., a static indication, for example, at the right top side of the web page.

Figures 6A, 6B, 6C, 6D:
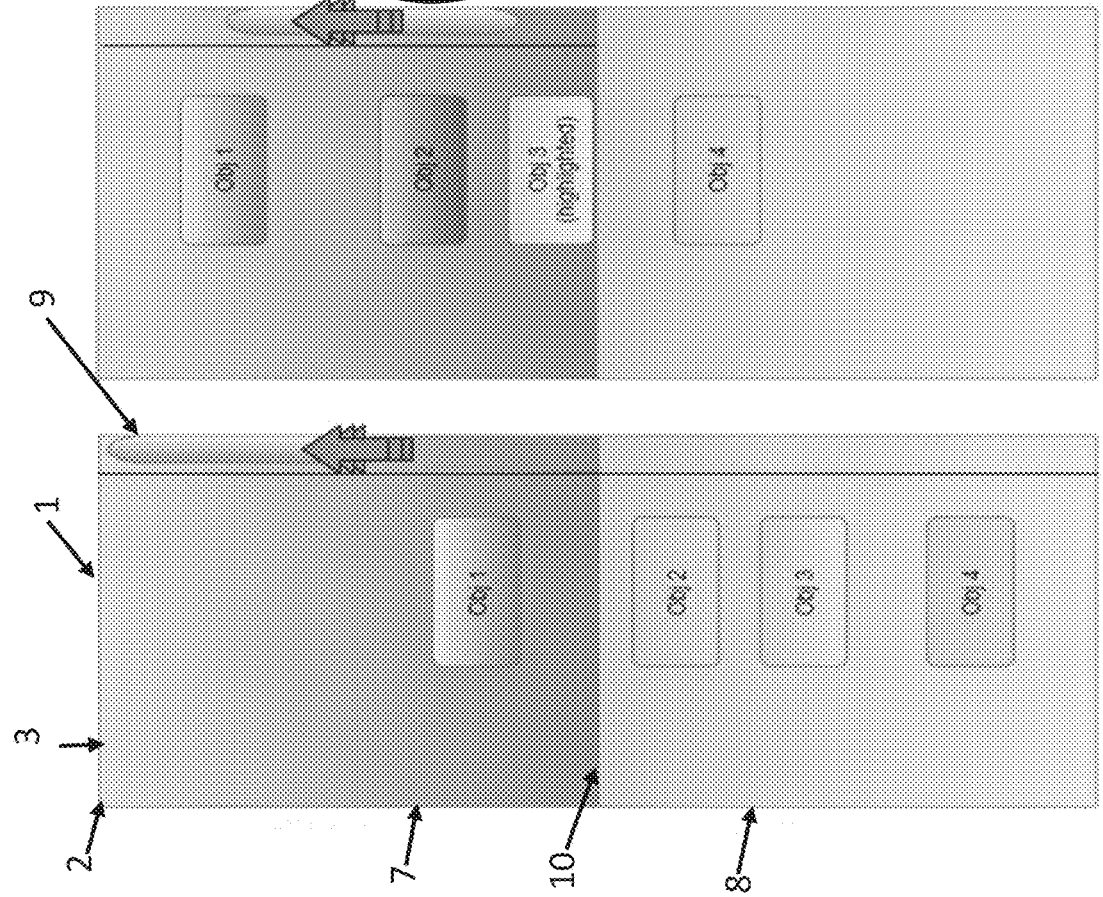
FIG. 6a to FIG. 6d show still a further schematic illustration of a web page presented on a screen according to yet another embodiment of the invention.

Here, again Obj3 is a visual object to be stopped when entering the screen 2 (FIG. 6b). Then it will remain at a certain position on the screen (FIG. 6c) for a predetermined period of time before it will resume its original scrolling speed and disappear from the screen (FIG. 6d). Also for this procedure, a new CSS property may be defined named objstop. This may take the values "false" meaning the behavior is identical to the default one, or "<time in milliseconds>" meaning that scroll will be stalled for this amount of milliseconds. This field may be inserted into the web page visual objects that the web page designer desires to present with a scrolling speed of zero (stopped). Applied to the example shown in FIGS. 5a to 5d, this would mean that Obj3 is provided with the objstop property set to a given time of milliseconds. When Obj3 is completely visible on the screen 2, then scrolling speed is reduced to zero, thereby stopping the visual object Obj3 on the screen 2. The indication for fast scrolling is changed to the stop sign and the visual object Obj3 is highlighted in order to provide feedback to the web page user. the user may click on the highlighted object Obj3 in order to override the stopped scrolling speed. Then the visual object Obj3 will resume its original scrolling speed at once. Otherwise, when the given time of milliseconds has elapsed, the original scrolling speed will be resumed again.

Figure 7:
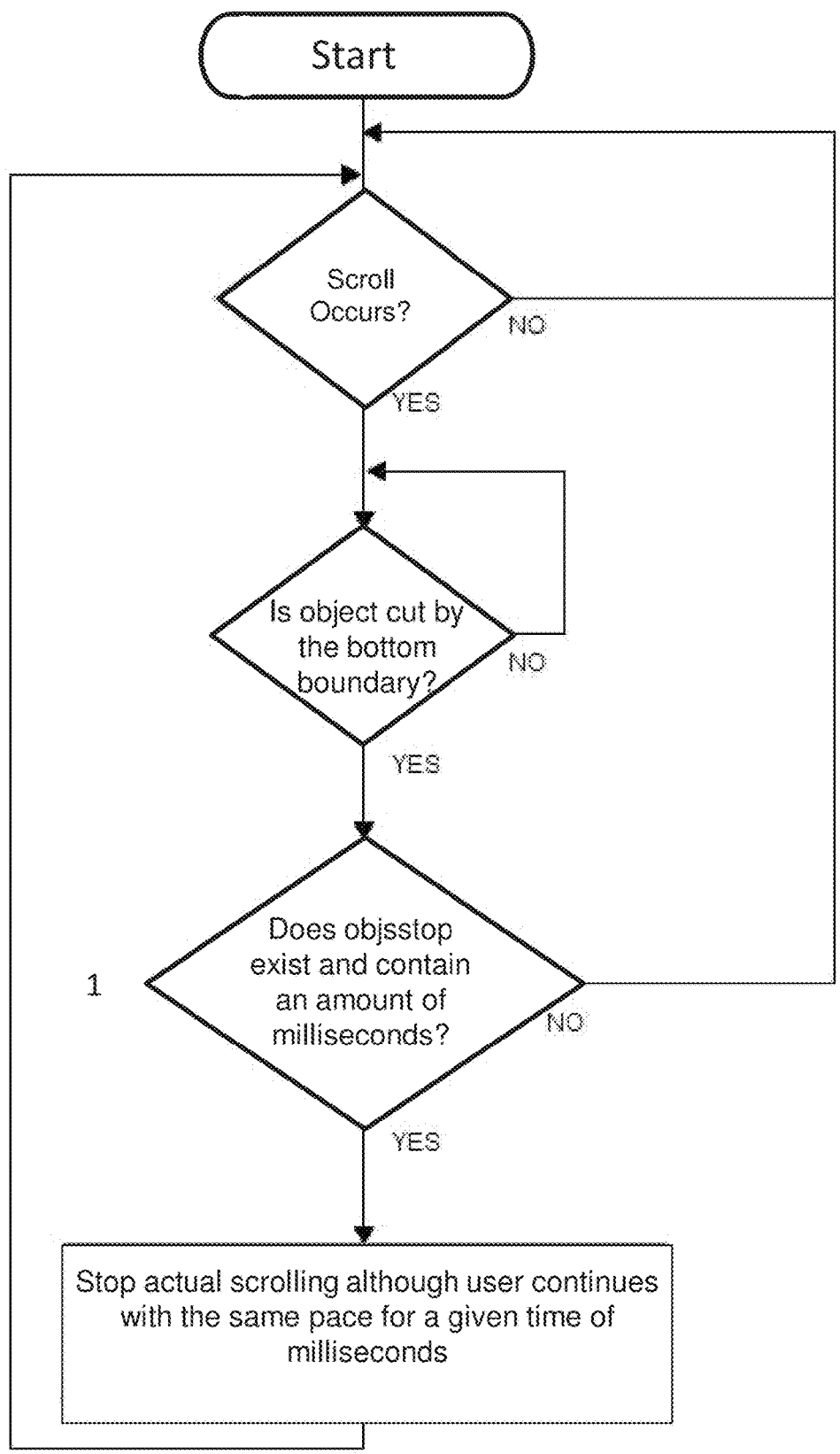
FIG. 7 shows a flowchart of a method for scrolling visual page content according to the embodiment shown in FIG. 6a to FIG. 6d.

FIG. 7 shows a flowchart of a method for scrolling visual page content according to the embodiment shown in FIGS. 6a to 6d. After starting the procedure, first a determination if a scrolling action according to a predefined scrolling speed occurs is made. If the determination is positive, then it is determined, if the visual object is cut by the bottom boundary or bottom line of the screen for identifying whether the visual object enters the screen so as to be displayed. If this again can be confirmed, then it is determined, if the CSS property objsstop exists, and if it contains an amount of milliseconds. If both is true, then scrolling according to the predefined scrolling speed of the thus identified visual object will slowed down to zero, namely, the object is stopped for a given time of milliseconds as soon as it crosses the lower border of the screen so as to enter the latter. If the visual object at the upper border line 3 of the screen 2 exits the latter, then the original predefined scrolling speed is resumed according to input via a scrolling means, as a mouse or navigation bar. According to this method, the visual objects qualifying for being displayed on the screen with a speed different from the predefined scrolling speed may be highlighted.

FIG. 8a to FIG. 8d shows still a further schematic illustration of a web page 1 presented on a screen 2 according to yet another embodiment of the invention. Here, a case is concerned where it may be necessary to scroll some sections or visual objects faster and some other sections or visual objects slower or to even stop them. For example, if the web page designer decides that there are items that are of medium importance, then scrolling could be stalled. The decision, how the visual objects are to be presented, namely, at which scrolling speed may depend on the importance of the content comprised in the respective visual objects. For this, e.g., several weighting significance levels 0 to 3 may be defined as listed below.

Weighting Significance

0—none
1—low
2—medium
3—high

As can be seen in FIG. 8a, the first visual object Obj1 has been assigned to no significance level at all. Thus, the scrolling speed will be completely controlled according to the user's scrolling action by means of a scrolling means. Further, the second visual object Obj2 has been assigned to a significance level of 2 out of a scale of 3 meaning that scrolling will be slowed down to a medium speed but not to the lowest. Further, Obj3 has the significance level of 3. Since this is the highest level, the scrolling speed will be reduced to a minimum speed. As can be seen in the figures, Obj2 and Obj3 co-exist on the screen 2. In this case, the visual object with the highest significance level will control the speed (i.e., the lowest possible). As can be seen in FIG. 8d, Obj3 exits the screen 2 whereupon the original scrolling speed set by the user is resumed.

For realizing the above mentioned scrolling feature, the CSS property introduced for the embodiment shown in FIGS. 4a to 4d may be augmented and may take the values given below:
0—behavior is identical to the default one,
1—scroll will be stalled in a small amount from user's speed,
2—scroll will be stalled in a medium amount from user's speed, and
3—scroll will be stalled in a large amount from user's speed
It is noted that fast scrolling mechanism can permit users to effect scrolling so that it is not performed step by step, but is performed in many steps at a time. In such a case, all of the embodiments described above will automatically adapt to the CSS attributes set (or other language attribute set utilized in that embodiment) by the algorithms given above. However, if the above mentioned functionalities are to be applied after a given time period, then a new complementary parameter will have to be defined indicating after how many milliseconds the effect will take place. The new CSS property parameters can be named objtime with the following values: "false" with no time effect, or <time in milliseconds>.

Figure 9A:
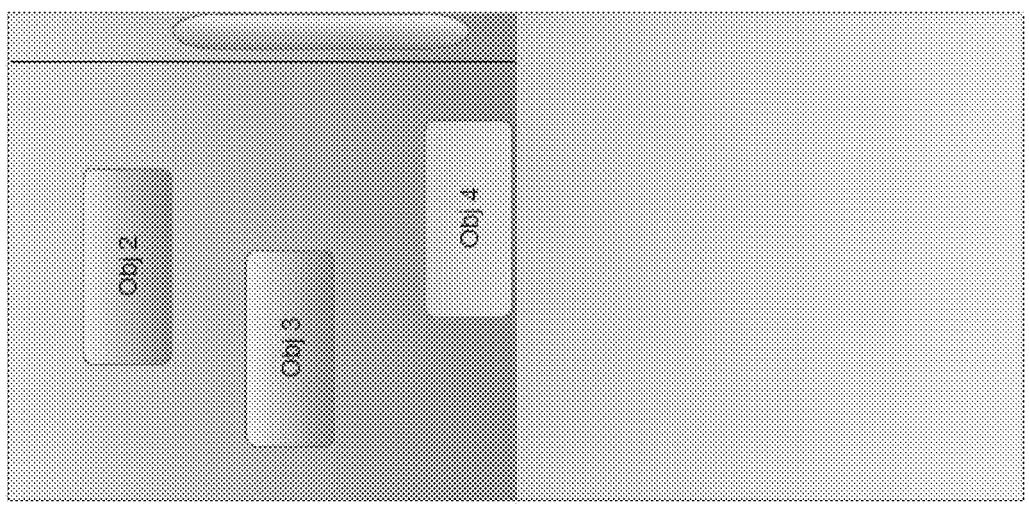
FIG. 9a to FIG. 9c show a further schematic illustration of a web page presented on a 30 screen according to yet another embodiment of the invention.
Figure 9B:
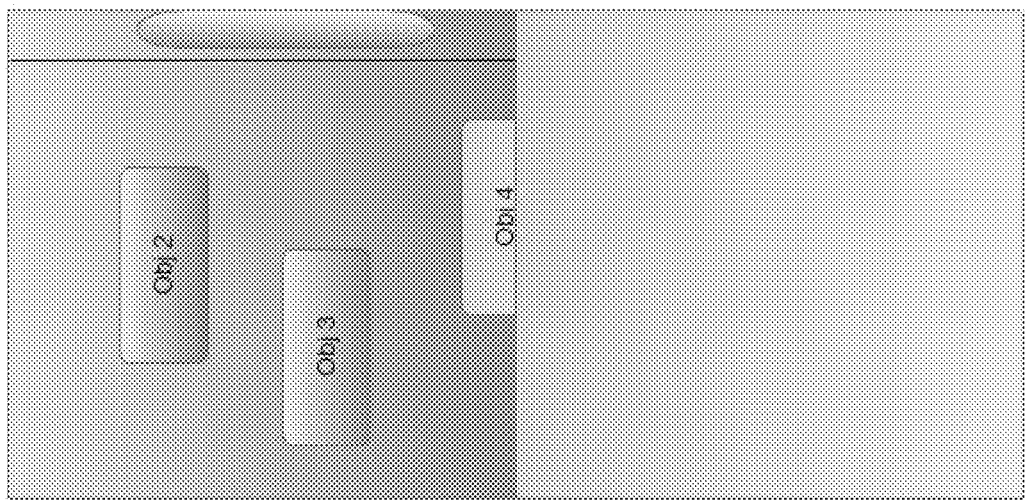
Figure 9C:
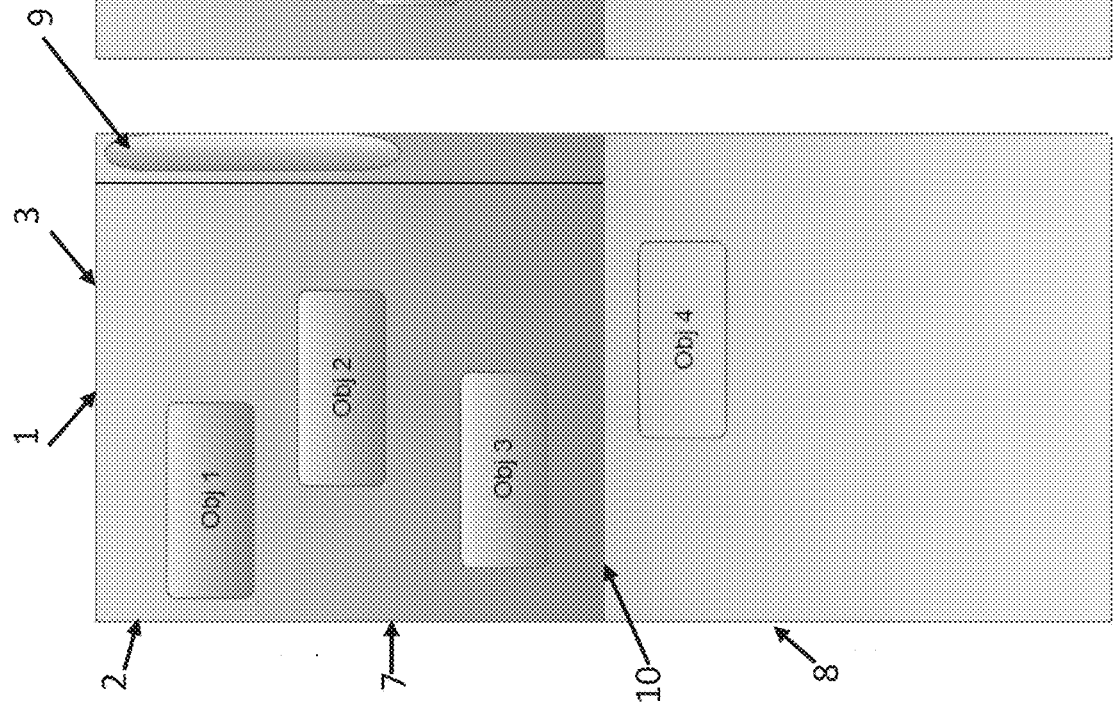

FIG. 9a to FIG. 9c show a further schematic illustration of a web page 1 presented on a screen 2 according to yet another embodiment of the invention. With respect to this embodiment it is noted that in many web pages, the mouse scrolling functionality is provided via a browser mechanism. As input, this mechanism uses the steps of the mouse scroll and rolls (or otherwise moves) the page up or down based on how many steps have been input. The actual scroll steps in the web page are dependent on the browser implementation. Hence, if for instance a browser has set each mouse scroll step so as to correspond to a 10 pixel step, then, when a user scrolls 10 steps with the mouse, the page will be shifted 100 pixels up or down depending on the orientation. This implementation ensures a smooth and linear search to the web page. However, when a user is viewing a web page 1 and this page contains a visual object, as an image, which is not yet visible on the screen 2, then a linear scroll will reveal only part of the visual object and not the complete visual object. On the other hand, if the user would like to see the complete image, then he might scroll down too far, reveal other objects below the image, possibly lose parts that belonged on top and subsequently will need to scroll up again. This can become tedious for some users.

Inside a style sheet language like CSS, a programmer cannot set rules that will handle the scrolling and set limits in the way a user is reading a page (this differs from functionality permitted by Javascript frameworks or Adobe Flash Players which essentially define a new platform a programmer may utilize). This can be beneficial not only for the reading functionality but also for the viewing of the web page 1. For instance, when a web page 1 has three consecutive vertically arranged images or visual objects Obj1, Obj2, Obj3, and the programmer would like to present these in the same viewing space. For this, according to an embodiment of the invention, a method is defined according to which a programmer will set a bottom limit to a visual object according to which, when scrolling the latter, the entire visual object will be displayed. In the figures it can be seen that the visual object Obj4 is located at a lower section of the web page 1 in its non-visible part 8. If a scrolling action is performed, then the visual object Obj4 will be moved upwards, entering the screen 2, but will not be fully visible (FIG. 9b). However, when applying the method described above, then the web page 1 is moved to a state shown in FIG. 9c. Even though the user has scrolled down by using a scrolling means like a mouse, stylus, touch-screen interface, etc., the web page 1 has not moved there but rather a bit further downwards and the visual object Obj4 is fully visible.

For implementing the above mentioned feature, a new CSS property may be introduced called objal which may the following parameters, namely, "true" then scrolling as shown in FIG. 9c will be effected. Thus, if the visual object Obj4 is cut by the application's viewing space end, the scroll will be proceeded until it reaches the end of the line. If the parameter is "false" then scrolling will be effected as described with respect to FIG. 9b. Another parameter will be <objectID> which is considered as true, but with the additional functionality according to which the actual visual object will be assigned to a value used in the embodiment described below with respect to FIG. 10a to FIG. 10c. In addition to the aforementioned effect, it can be seen from FIGS. 9b and 9c that when the visual object Obj4 is cut and the web page 1 is automatically shifted down, then also the navigation bar 9 changes its position. The objal field is only valid for scrolling with the mouse stepping function. In case the user scrolls the web page 1 manually by means of a mouse pointer or via the browser's arrow movement, then this is not effected and the functionality as described with respect to FIG. 10b is assumed.

Figure 10C:
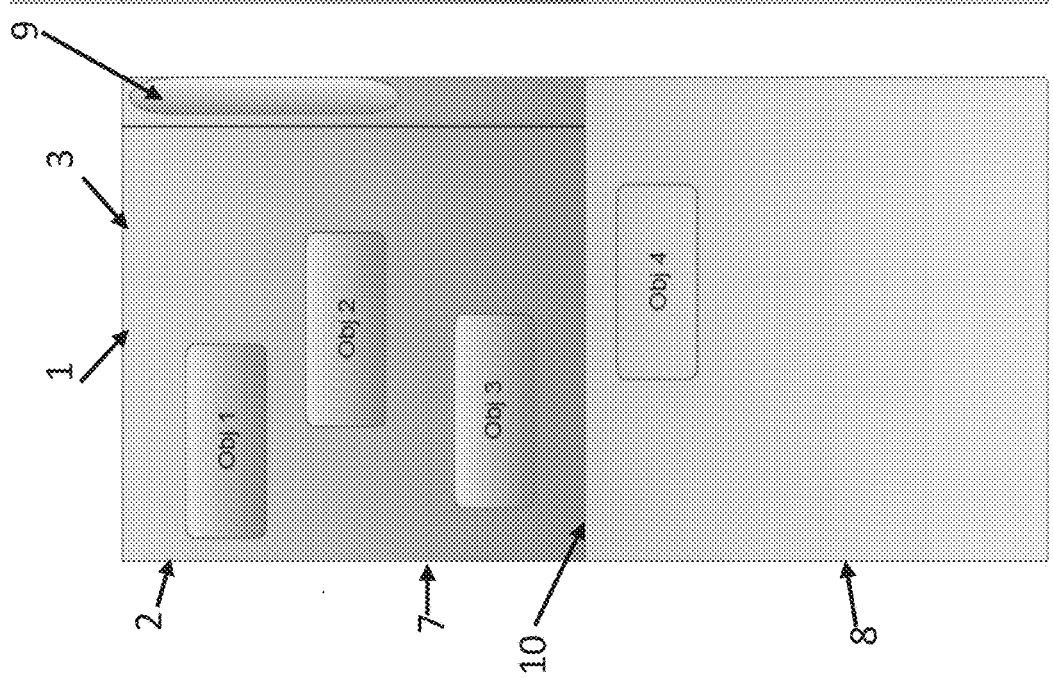
FIG. 10a to FIG. 10c show a further schematic illustration of a web page presented on a screen according to still a further embodiment of the invention.
Figure 10B:
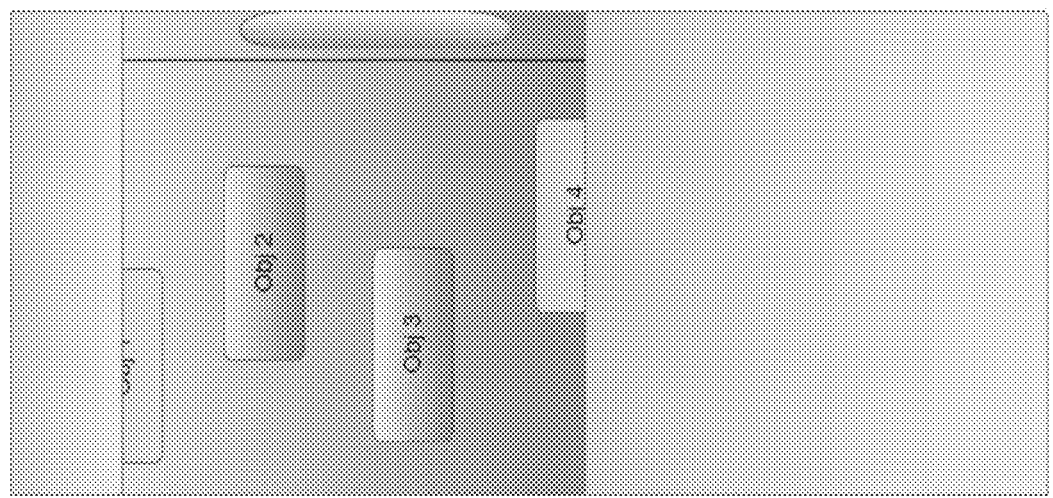
Figure 10A:
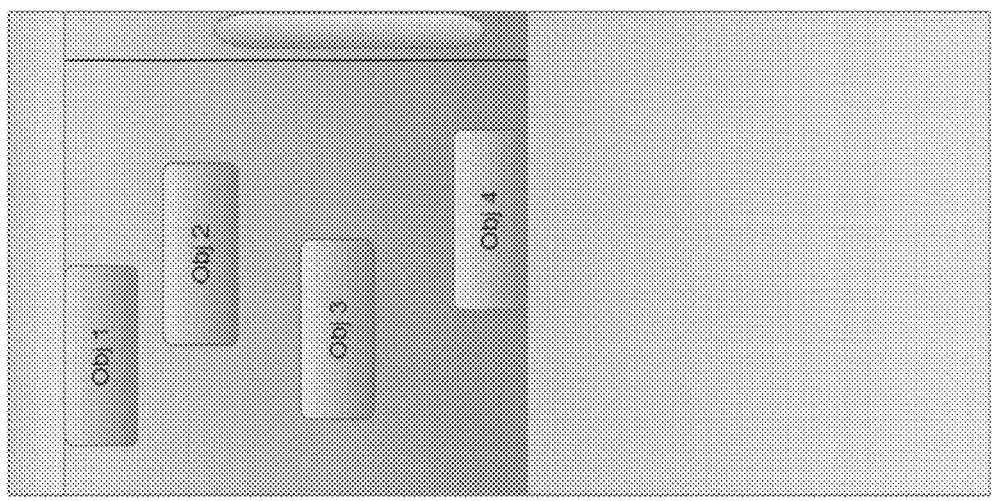

FIG. 10a to FIG. 10c show a further schematic illustration of a web page 1 presented on a screen 2 according to still a further embodiment of the invention. Here, the functionality described above with respect to FIG. 9a to FIG. 9c is combined with the top boundary of the view. For instance, there are some cases where a user might wish to view an object a bit further down. However he or she doesn't want to miss another object a bit further up in the web page 1. In a normal case (FIG. 10b), the user would lose the first visual object Obj1. Therefore, an additional CSS property is introduced here, denoting that the visual object Obj1 will not be cut if it lies on the top boundary of the visible part 7 in combination with another visual object being located a bit further down (i.e. Obj4). In this case, the browser will understand this action and it will translate it as a zoom-out function which is already embedded in most browsers so that the visual objects are adapted to the top and bottom boundaries or bottom lines 10 of the screen 2 so that the visual objects Obj1 at the top and Obj4 at the bottom can be are displayed completely.

For implementing the above described functionality, a new CSS property objtop may be introduced which may take the values "false" meaning nothing will affect the object which is referred by the CSS property; or <objectID> corresponding to the objectID which might be set from another object in the HTML document with tag objal. In case there is no objal in the document with this objectID, then false will be considered by the browser. In case objal is set, test1 is set for a first object in the HTML document and objtop: test1 is set for another one, then when Obj4 is cut by bottom line 10 of the screen 2, and the visual object Obj1 is cut by the top boundary of the screen 2, the browser will automatically zoom the view to the level that both Obj1 and Obj2 are presented. In case Obj1 is not cut, this will not be effected. This is for ensuring that no big zoom-outs occur when the browser is in a 'Restore' mode (i.e. not maximized) or resolution is very small.

Figure 11:
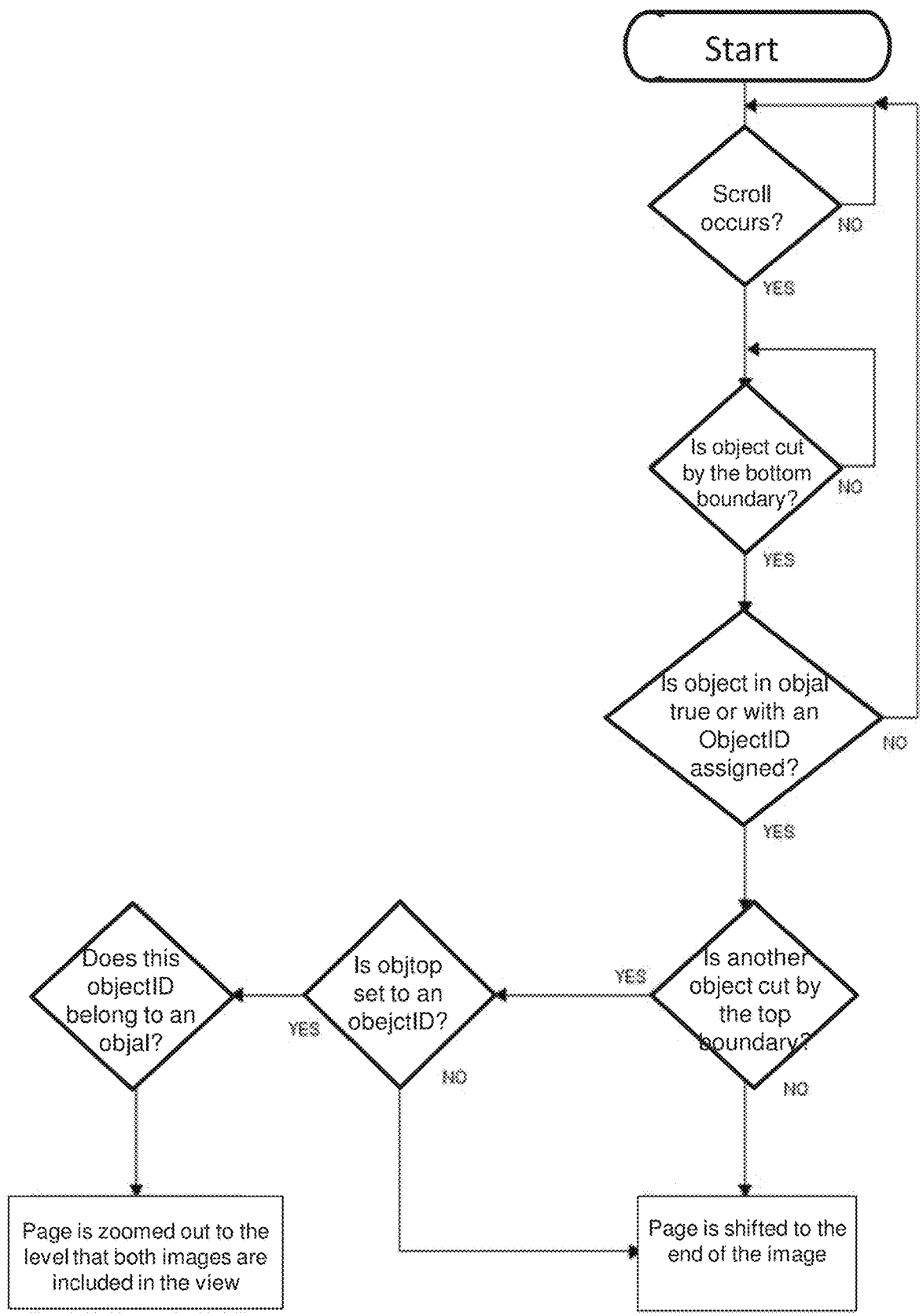
FIG. 11 shows a flowchart of a method for scrolling visual page content according to the embodiments shown in FIG. 9 to FIG. 9 and FIG. 10a to FIG. 10c.

FIG. 11 shows a flowchart of a method for scrolling visual page content according to the embodiments shown in FIG. 9a to FIG. 9c and FIG. 10a to FIG. 10c. After start, in a first step, it is determined whether scroll occurs. If this is affirmed, then it is determined if the visual object is cut by the bottom line 10 of the screen 2. If so, then it is determined if the object is objal true or is assigned to an objectID. If this is true, then it is determined, if another object is cut by the top boundary. If this is not the case, the web page is shifted to the end of the image. Otherwise, if this is true, then it is determined, if objtop is set to an objectID. If so, then it is determined in a next step if this objectID belongs to an objal. Then the web page is zoomed out to the level that both images are included in the view or visible part of the screen.

It should be understood that embodiments of the communication system, device, apparatus, non-transitory computer readable medium, and method may be configured to meet different design criteria. Therefore, while certain exemplary embodiments of apparatus, system, medium, and device, and methods of making and using the same have been discussed and illustrated herein, it is to be distinctly understood that the invention is not limited thereto but may be otherwise variously embodied and practiced within the scope of the following claims.

What is claimed is:

1. A method for scrolling visual page content of a web page in a predetermined direction on a screen of a display device, the visual page content of the web page comprising a predetermined number of visual objects, the visual objects being arranged for subsequent display in the predetermined direction, wherein the method comprises:
   displaying a first visual object of the visual objects on the screen;
   detecting, based on signals from an input device, a scrolling action and a first scrolling speed for moving the visual objects in the predetermined direction on the screen, when the first visual object is displayed on the screen and a second visual object is not displayed on the screen;
   determining a value of a pre-defined property of the second visual object based on a tag associated with the second visual object or a field of a style sheet language associated with the web page or a markup language associated with the web page, the value of the pre-defined property of the second visual object determining a scrolling speed for display of the second visual object on the screen, wherein the scrolling speed is based on the tag associated with the second visual object; and
   scrolling the second visual object on the screen at the second scrolling speed that is a selected one of the first scrolling speed or zero based on the determined value of the pre-defined property such that when the second scrolling speed is selected to be zero, scrolling of the second visual object on the screen is paused for a pre-defined pause period of time and, after the pre-defined pause period of time elapses, movement of the second visual object on the screen resumes at the first scrolling speed.

2. The method of claim 1, comprising:
   determining a vertical position of the first visual object displayed on the screen for defining a reference position on the screen,
   moving the first visual object off the screen so that the first object is no longer shown on the screen, and
   displaying the second visual object at the reference position on the screen.

3. The method of claim 2,
   wherein the movement of the visual objects on the screen is effected in a vertical direction and the first scrolling speed is defined as a fast scrolling speed, and
   wherein upon detecting the scrolling action, the second visual object is moved from a bottom edge of the screen directly to the reference position at which the second visual object is subsequently paused for the pre-selected pause period of time.

4. The method of claim 1 comprising:
   determining whether the second visual object is cut by a lower line of the screen, while the first visual object is currently displayed on the screen.

5. The method of claim 1, comprising:
   determining an object identification parameter for the first visual object, the object identification parameter indicating that the second visual object is to be displayed subsequently to the first visual object at a reference position at which the first visual object is currently displayed.

6. The method of claim 1, wherein the detecting of the scrolling action comprises:
   detecting the scrolling action for moving the visual objects in the predetermined direction, and wherein the method further comprises:
   detecting a predefined scrolling speed that is associated with the first scrolling speed based on the signals from the input device, the first scrolling speed being defined as a fast scrolling speed; and
   defining the second visual object as a highlighted object such that, upon detection of the scrolling action, a scrolling speed different from the first scrolling speed is applied to the second visual object when the second visual object is displayed on the screen.

7. The method of claim 1, comprising:
   moving the second visual object at the first scrolling speed along the screen after the predefined pause period of time such that the second visual object is displayed on the screen until it disappears from the screen; and
   displaying a third visual object of the visual objects on the screen as the second visual object is moved along the screen after the pre-defined pause period of time.

8. The method of claim 7, comprising:
   defining the third visual object as a highlighted object such that, the third visual object is displayed on the screen as a highlighted visual object on the screen.

9. The method of claim 8, wherein the first scrolling speed is applied to the highlighted third visual object upon the third visual object entering the screen at a lower line or an upper line of the screen.

10. The method of claim 8, wherein the second visual object is a highlighted visual object such that the second visual object is highlighted when it is displayed on the screen and wherein the visual page content is scrolled at the first scrolling speed in response to detecting the scrolling action when no highlighted object is visible on the screen.

11. The method of claim 8, comprising:
moving the third visual object at the first scrolling speed in response to a selection of the highlighted third object displayed on the screen via the input device.

12. The method of claim 1, wherein the predetermined direction is a vertical direction.

13. The method of claim 1, wherein the detecting of the scrolling action comprises:
defining a third visual object of the visual objects as a highlighted object such that, upon detection of the scrolling action, a scrolling speed different from a predefined scrolling speed is applied to display of the highlighted third visual object during scrolling; and
wherein the scrolling speed is controlled according to a weighting factor defined for each visual object, the weighting factor being determined based on a defined significance of the visual object.

14. The method of claim 13, comprising:
defining a scrolling speed based on a pre-selected significance level for the visual objects so that a visual object having a higher than a baseline significance level is scrolled at a scrolling speed that is slower than the first scrolling speed, and the scrolling speed is set higher than the first scrolling speed when the significance is lower than the baseline significance level.

15. A system for scrolling visual page content, comprising:
a user terminal comprising:
a display device with a screen configured to display the visual page content, the visual page content comprising a predetermined number of visual objects arranged for subsequent display in a predetermined direction, and
a controller configured to:
effect a display of at least one visual object on the screen,
detect a scrolling action for moving the at least one visual object on the screen,
determine a value of a pre-defined property of the visual object based on a tag associated with the visual object or a field of a style sheet language associated with the visual page or a markup language associated with the visual page, the value of the pre-defined property of the second visual object including a boolean value indicative of a scrolling speed for display of the second visual object on the screen, wherein the scrolling speed is based on the tag associated with the visual object,
scrolling the visual object at the second scrolling speed that is a selected one of a first scrolling speed or zero based on the determined value of the pre-defined property such that when the scrolling speed is selected to be zero, scrolling of the first visual object shown on the screen is paused for a pre-defined pause period of time and, after the pre-defined pause period of time elapses, movement of the first visual object on the screen resumes at the first scrolling speed.

16. The system of claim 15, comprising a pointer device connectable to the controller to facilitate communication of the information on the scrolling behavior to the controller.

17. The system of claim 15, wherein the display is configured so that the screen is a touch screen that facilitated communication of the information on the scrolling behavior to the controller.

18. A non-transitory computer readable medium having code stored thereon that defines a method that is executed by a processor of a communication device that executes the code, the method comprising:
displaying a first visual object of a plurality of visual objects of a web page on a screen;
detecting a scrolling action for moving the visual objects on the screen, when the first visual object of the web page is displayed on the screen and a second visual object of the web page is not displayed on the screen;
associating the detected scrolling action with a first scrolling speed for movement of the first visual object and the second visual object;
detecting information on scrolling behavior of the second visual object based on a pre-defined property of the second visual object defined using a field of a style sheet language associated with the web page or a markup language associated with the web page, the pre-defined property defining a scrolling behavior for display of the second visual object of the web page and a scrolling speed based on a tag associated with the second visual object; and
scrolling the second visual object on the screen based on the detected information on scrolling behavior such that the first scrolling speed for scrolling of the second visual object is slowed to a speed of zero so that scrolling of the second visual object shown on the screen is paused for a pre-defined pause period of time and, after the pre-defined pause period of time elapses, movement of the second visual object on the screen resumes, wherein the pause period of time is determined based on the predefined property.

19. The non-transitory computer readable medium of claim 18,
wherein the method comprises:
defining a third visual object of the plurality of visual objects as a highlighted object such that, the third visual object is displayed on the screen as a highlighted visual object on the screen during a display of the third visual object on the screen that occurs in response to the detected scrolling action.

20. The non-transitory computer readable medium of claim 19,
wherein the method comprises:
controlling the scrolling speed for the highlighted third visual object based on a weighting factor defined for the highlighted third visual object, the weighting factor being determined based on a defined significance of the highlighted third virtual object such that the highlighted third virtual object is scrolled at a second scrolling speed different from the first scrolling speed or a third scrolling speed different from the first scrolling speed, the second scrolling speed being slower than the first scrolling speed and the third scrolling speed being faster than the first scrolling speed.

21. The method of claim 1, wherein the second scrolling speed is equal to the first scrolling speed when the value of the pre-defined property of the second visual object is a first value; and the pre-defined pause period of time is equal to the value of the pre-defined property when the value is different from the first value.

* * * * *

UNITED STATES PATENT AND TRADEMARK OFFICE
CERTIFICATE OF CORRECTION

PATENT NO. : 11,537,284 B2
APPLICATION NO. : 15/602619
DATED : December 27, 2022
INVENTOR(S) : Theodoros Giannopoulos et al.

It is certified that error appears in the above-identified patent and that said Letters Patent is hereby corrected as shown below:

On the Title Page

Item (30) Foreign Application Priority Data, "16172751" should read as --16172751.6--.

In the Claims

Claim 8, Column 14, Line 66, "that, the" should read as --that the--.

Claim 19, Column 16, Line 48, "that, the" should read as --that the--.

Signed and Sealed this
Twenty-eighth Day of March, 2023

Katherine Kelly Vidal
*Director of the United States Patent and Trademark Office*